US012592472B2

(12) United States Patent
Choi et al.

(10) Patent No.: US 12,592,472 B2
(45) Date of Patent: Mar. 31, 2026

(54) ELECTRONIC DEVICE

(71) Applicant: Samsung Electronics Co., Ltd., Suwon-si (KR)

(72) Inventors: Dooseok Choi, Hwaseong-si (KR); Young Min Kim, Yongin-si (KR); Min Young Yoon, Osan-si (KR); Young Ki Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 158 days.

(21) Appl. No.: 17/886,808

(22) Filed: Aug. 12, 2022

(65) Prior Publication Data

US 2023/0170601 A1 Jun. 1, 2023

(30) Foreign Application Priority Data

Nov. 29, 2021 (KR) ........................ 10-2021-0166638

(51) Int. Cl.

*H01Q 1/22* (2006.01)
*H01Q 9/04* (2006.01)
*H01Q 21/06* (2006.01)

(52) U.S. Cl.

CPC ......... *H01Q 1/2283* (2013.01); *H01Q 9/0414* (2013.01); *H01Q 21/065* (2013.01)

(58) Field of Classification Search

CPC ............... H01Q 9/0414; H01Q 21/065; H01Q 21/0006; H01Q 21/24; H01Q 1/2283; H01Q 1/22; H01Q 1/38; H01Q 1/50; H01Q 5/307; H01Q 21/00; H01Q 9/0407; H01Q 1/46; H01Q 21/0025

See application file for complete search history.

(56) References Cited

U.S. PATENT DOCUMENTS 10,381,734 B2 8/2019 Astakhov et al.
10,931,014 B2 2/2021 Tehran et al.
2009/0102723 A1* 4/2009 Mateychuk .............. H01Q 5/40 343/700 MS
2013/0141284 A1 6/2013 Jeong
2019/0214703 A1* 7/2019 Choi .................... H01Q 21/061
2020/0287298 A1 9/2020 Ueda
2020/0358203 A1* 11/2020 Park ........................ H01Q 1/243
2021/0242591 A1 8/2021 Kim et al.
2023/0379023 A1* 11/2023 Henry ................ H01Q 21/0087
2024/0195075 A1* 6/2024 Sudo ...................... H01Q 13/08

FOREIGN PATENT DOCUMENTS

KR 20020041769 A 6/2002
KR 20190085818 A 7/2019

* cited by examiner

*Primary Examiner* — Hoang V Nguyen
*Assistant Examiner* — Anna N Hamadyk
(74) *Attorney, Agent, or Firm* — Harness, Dickey & Pierce, P.L.C.

(57) ABSTRACT

An electronic device includes a Radio Frequency Integrated Circuit (RFIC) chip, a first antenna module including a plurality of feed points electrically connected to the RFIC chip through a first feed line, and a second antenna module apart from the first antenna module. The second antenna module includes a plurality of feed points electrically connected to the RFIC chip through a second feed line, and a number of the plurality of feed points of the first antenna module is different from a number of the plurality of feed points of the second antenna module.

19 Claims, 17 Drawing Sheets

200a

ELECTRONIC DEVICE

CROSS-REFERENCE TO RELATED APPLICATION

This U.S. non-provisional patent application claims priority under 35 U.S.C. §119 to Korean Patent Application No. 10-2021-0166638 filed on Nov. 29, 2021 in the Korean Intellectual Property Office, the disclosure of which is incorporated by reference herein.

BACKGROUND

The present disclosure relates to an electronic device including an antenna module.

High frequency bands may be used to increase a throughput of wireless communication. For example, a wireless communication system such as 5G (5th Generation) specifies usage of a millimeter wave (mmWave) frequency band. Therefore, an antenna for wireless communication may be used to provide a wide frequency bandwidth. Further, an antenna array including a plurality of antennas may be used for beamforming, and it may be desirable for the antenna array to provide good beam coverage.

However, in the case of portable wireless communication equipment such as mobile phones, a space for an antenna may be limited, and therefore an antenna that provides good performance may be important despite a limited space and other components adjacent to the antenna.

SUMMARY

Some aspects of the present disclosure provide an antenna that may achieve high output in a limited space.

Some aspects of the present disclosure may provide an antenna having a wider communication radius in a limited space.

However, aspects of the present disclosure are not restricted to the ones set forth herein. The above and other aspects of the present disclosure may become more apparent by referencing the detailed description of the present disclosure given below.

According to an example embodiment of the present disclosure, an electronic device includes a Radio Frequency Integrated Circuit (RFIC) chip, a first antenna module including a plurality of feed points electrically connected to the RFIC chip through a first feed line, and a second antenna module apart from the first antenna module. The second antenna module includes a plurality of feed points electrically connected to the RFIC chip through a second feed line, and a number of the plurality of feed points of the first antenna module is different from a number of the plurality of feed points of the second antenna module.

According to another example embodiment of the present disclosure, an electronic device includes an antenna module including a plurality of first feed points and a plurality of second feed points, a first Radio Frequency Integrated Circuit (RFIC) chip electrically connected to the plurality of first feed points of the antenna module through a first feed line, and a second RFIC chip electrically connected to the plurality of second plurality of feed points of the antenna module through a second feed line.

According to another example embodiment of the present disclosure, an electronic device includes a Radio Frequency Integrated Circuit (RFIC) chip, and a first antenna array including a first antenna module, a second antenna module, a third antenna module, a fourth antenna module and a fifth antenna module. Each module includes a plurality of feed points electrically connected to the RFIC chip through a corresponding one of a first feed line, a second feed line, a third feed line, a fourth feed line and a fifth feed line each configured to provide at least one differential signal. Each of the first antenna module, the second antenna module, the third antenna module, the fourth antenna module and the fifth antenna module includes a first conductive patch configured to transmit and/or receive a signal of a first frequency band, and a second conductive patch configured to transmit and/or receive a signal of a second frequency band lower than the first frequency band. A number of the plurality of feed points of the first antenna module is different from a number of the plurality of feed points of the second antenna module.

It should be noted that effects of the present disclosure are not limited to those described above, and other effects of the present disclosure may be apparent from the following description.

BRIEF DESCRIPTION OF THE DRAWINGS

The above and other aspects and features of the present disclosure may become more apparent by describing in detail some example embodiments thereof with reference to the attached drawings, in which.

DETAILED DESCRIPTION

Hereinafter, some example embodiments according to inventive concepts of the present disclosure will be described referring to the accompanying drawings.

Figure 1:
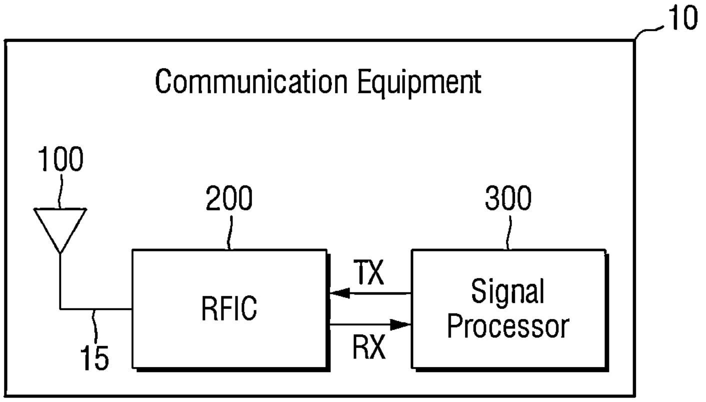
FIG. 1 is a diagram illustrating communication equipment according to some example embodiments.

FIG. 1 is a diagram for explaining the communication equipment according to some example embodiments.

As shown in FIG. 1, a communication equipment 10 may include an antenna 100, and may communicate with other communication equipment in a wireless communication system by transmitting and receiving signals through the antenna 100, and may be called a wireless communication equipment.

The wireless communication system in which the communication equipment 10 communicates with the other communication equipment may be, as non-restrictive examples, a wireless communication system using a cellular network, such as, a 5G (5th generation wireless) system, an LTE (Long Term Evolution) system, an LTE-Advanced system, a CDMA (Code Division Multiple Access) system, and a GSM (Global System for Mobile Communications) system, may be a WLAN (Wireless Local Area Network) system, or any other wireless communication system. Hereinafter, the wireless communication system may be described referring to a wireless communication system using a cellular network. However, inventive concepts of the present disclosure are not limited thereto.

As shown in FIG. 1, the communication equipment 10 may include an antenna 100, an RFIC (Radio Frequency Integrated Circuit) 200, and a signal processor 300, and the antenna 100 and the RFIC 200 may be connected through a feed line 15. In some example embodiments, the antenna 100 may be referred to as an antenna module, and the antenna 100 and the feed line 15 may be collectively referred to as an antenna module. Further, the antenna 100, the feed line 15, and the RFIC 200 may be collectively referred to as an RF system or an RF device.

The RFIC 200 may provide the signal, which may be generated by processing a transmission signal TX provided from the signal processor 300 in a transmission mode, to the antenna 100 through the feed line 15. The RFIC 200 may provide a reception signal RX to the signal processor 300 by processing the signal received from the antenna 100 through the feed line 15 in a reception mode. For example, the RFIC 200 may include a transmitter, and the transmitter may include a filter, a mixer, and a power amplifier (PA). Further, the RFIC 200 may include a receiver, and the receiver may include a filter, a mixer, and a low noise amplifier (LNA). In some example embodiments, the RFIC may include multiple transmitters and receivers, and may include transceivers in which the transmitters and receivers are combined.

The signal processor 300 may generate the transmission signal TX by processing a signal including information to be transmitted, and may generate a signal including information by processing the reception signal RX. For example, the signal processor 300 may include an encoder, a modulator, and a digital-to-analog converter (DAC) to generate the transmission signal TX. Further, the signal processor 300 may include an analog-to-digital converter (ADC), a demodulator, and a decoder to process the reception signal RX. The signal processor 300 may generate a control signal for controlling the RFIC 200, may set a transmission mode or a reception mode through the control signal, may adjust the power and gain of components included in the RFIC 200, and the like. In some example embodiments, the signal processor 300 may include one or more cores and a memory for storing instructions executed by the cores, and at least a part of the signal processor 300 may include a software block stored in the memory. In some example embodiments, the signal processor 300 may include a logic circuit which may be designed through logic synthesis, and at least a part of the signal processor 300 may include a hardware block implemented as a logic circuit.

A wireless communication system may specify a high spectral band for high quantity of data transmission. For example, a 5G cellular system (or 5G wireless system) may specify millimeter waves (mmWave) of 24 GHz or higher, but example embodiments are not limited thereto. The millimeter waves (mmWave) may allow wideband transmission and miniaturization of a RF system, such as the antenna 100 and the RFIC 200, and may provide improved directivity. On the other hand, since an attenuation may occur, it may be desirable to reduce the attenuation.

High transmission power may be used to reduce signal attenuation due to high frequency bands. According to a Friis transmission equation, the transmission power may be calculated as the product of the output power of the power amplifier and the gain of the antenna 100. When increasing the power by the power amplifier due to, for example, low power efficiency of the power amplifier included in the RFIC 200, heat generation, power consumption, or the like may be induced. Accordingly, it may be desirable to obtain a high antenna gain so as to increase the transmission power. The antenna gain may be proportional to the size of the effective opening area. However, in some example applications that prioritize space efficiency such as mobile phones, the effective opening area may also be limited. The higher the antenna gain is, the narrower the beam width output from the antenna 100 may be, and there may be a decrease in the communication range.

According to some example embodiments, the antenna 100 may receive a differential signal from the RFIC 200 through two or more feed lines. Therefore, as will be described later referring to FIG. 3, by supplying two signals having opposite phases to the separated feed points of the antenna 100, a high transmission power may be achieved without degrading the performance of the antenna 100.

Figure 2:
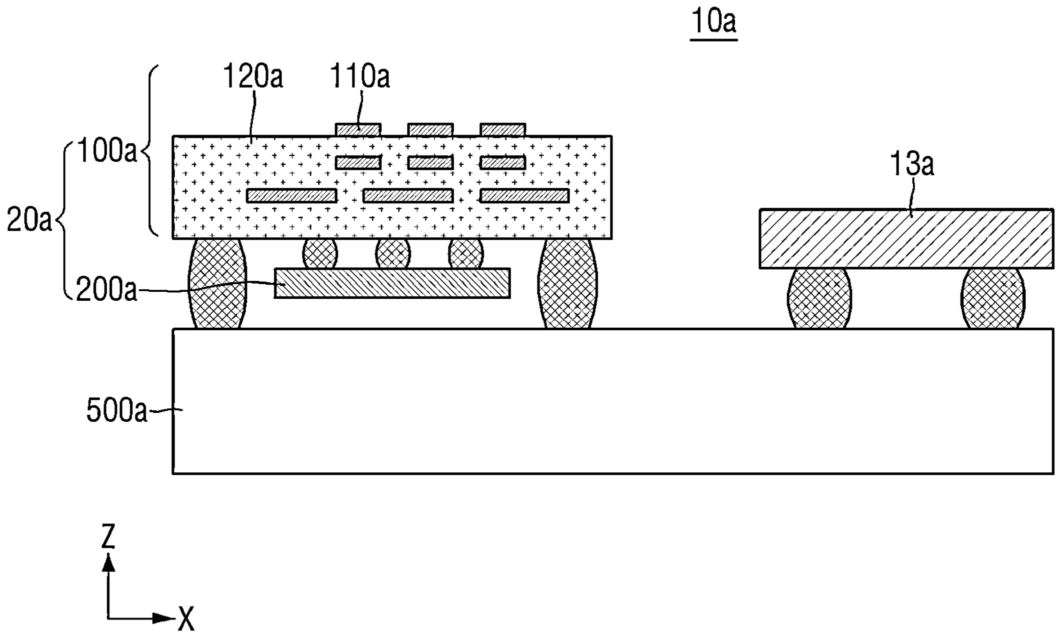
FIG. 2 shows an example of a layout of the components of the communication equipment 10 of FIG. 1 according to some example embodiments.

FIG. 2 shows an example of a layout of the components of the communication equipment 10 of FIG. 1 according to some example embodiments. Hereinafter, FIG. 2 will be described referring to FIG. 1, and the repeated contents of the description of FIG. 2 may be omitted. In some example embodiments, an X-axis direction and a Y-axis direction orthogonal to each other may each be referred to as a first horizontal direction and a second horizontal direction, and a plane including the X-axis and the Y-axis may be referred to as a horizontal plane. Further, the area may refer to an area in a plane parallel to the horizontal plane, and a direction perpendicular to the horizontal plane, that is, a Z-axis direction may be called a vertical direction. A component that is located relatively in a +Z-axis direction with respect to other components may be said to be above the other components, and a component that is placed relatively in a −Z-axis direction with respect to the other components may be said to be below the other components. Further, among the surfaces of the components, a surface in the +Z axis direction may be referred to as an upper surface of the component, and a surface in the −Z axis direction may be referred to as a lower surface of the component.

Because most loss parameters may be degraded in high frequency bands such as the millimeter wave (mmWave) frequency band, it may not be easy to use the layouts of the antenna 100 and the RFIC 200 used in low frequency bands, for example, bands below 6 GHz as it is. For example, an antenna feeding structure used in the low frequency band may significantly reduce the signal attenuation characteristics in the millimeter wave (mmWave) frequency band, and may generally degrade the EIRP (Effective Isotropic Radiated Power) and noise characteristics (noise figure). Therefore, in order to reduce or minimize the signal attenuation due to the feed line 15 of FIG. 1, the antenna 100 and the RFIC 200 may be placed adjacent to each other. In particular, mobile applications such as mobile phones may prioritize high space efficiency, and as shown in FIG. 2, a system-in-package (SiP) structure in which the antenna 100 is placed on the RFIC 200 may be adopted.

Referring to FIG. 2, the communication equipment 10*a* may include an RF system 20*a*, a digital integrated circuit 13*a*, and a carrier board 500*a*, and the RF system 20*a* and the digital integrated circuit 13*a* may be mounted on the upper surface of the carrier board 500*a*. The RF system 20*a* and the digital integrated circuit 13*a* may be connected to each other through conductive patterns formed on the carrier board 500*a* to be communicable with each other. According to some example embodiments, the carrier board 500*a* may be a PCB (Printed Circuit Board). The digital integrated circuit 13*a* may include the signal processor 300 of FIG. 1, thereby transmitting the transmission signal TX to the RFIC 200*a* or receiving the reception signal RX from the RFIC 200*a*, and providing a control signal for controlling the RFIC 200*a*. According to some example embodiments, the digital integrated circuit 13*a* may include one or more cores and/or memories, and may control the operation of the communication equipment 10*a*.

The RF system 20*a* may include an antenna module 100*a* and an RFIC chip 200*a*. As shown in FIG. 2, the antenna module 100*a* may include a substrate 120*a* and a conductor 110*a* formed on the substrate 120*a*. For example, the antenna module 100*a* may include a ground plane and a conductive patch parallel to the horizontal plane, and may include a feed line for supplying the signal from the RFIC chip 200*a* to the conductive patch. The RFIC chip 200*a* may have an upper surface that is electrically connected to a lower surface of the antenna module 100*a*. Although not specifically shown, in some example embodiments the RFIC chip 200*a* and the digital integrated circuit 13*a* may be mounted on the lower surface of the carrier substrate 500*b*.

Figure 3:
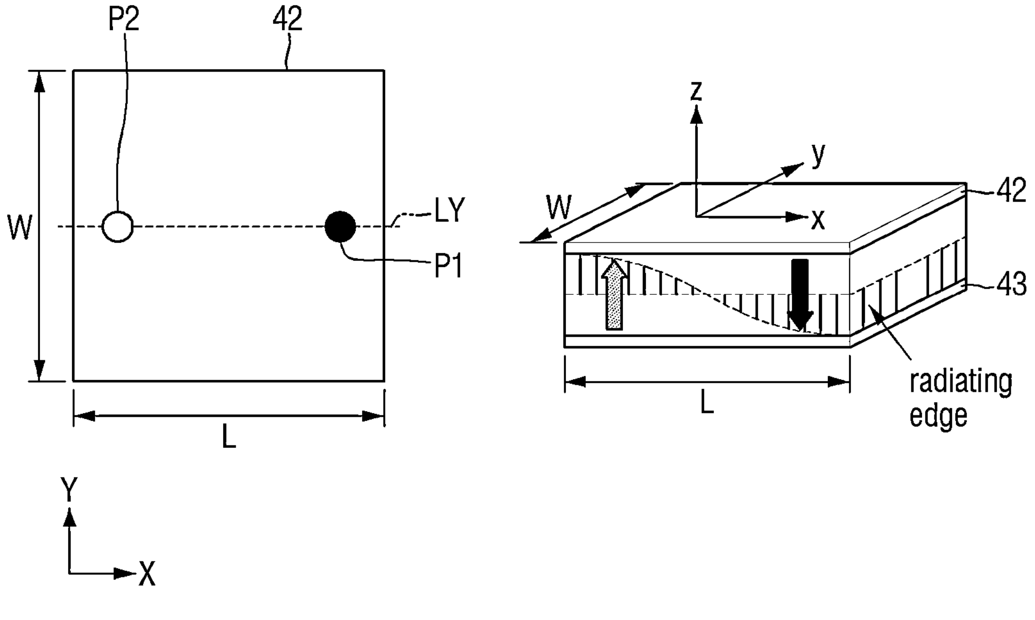
FIG. 3 is a diagram illustrating an electric field formed by the antenna module according to some example embodiments.

FIG. 3 is a diagram for explaining an electric field formed by the antenna module according to some example embodiments.

FIG. 3 is a diagram showing the conductive patch 42 included in the antenna module according to some example embodiments and the electric field formed by the conductive patch 42. Specifically, a left diagram of FIG. 3 shows feed points P1 and P2 connected to the two feed lines on the lower surface of the conductive patch 42, and a right diagram of FIG. 3 shows an electric field generated between the conductive patch 42 and the ground plate 43.

Referring to FIG. 3, the conductive patch 42 has a rectangular shape, and may have a length L in the X-axis direction and a length W in the Y-axis direction. According to some embodiments, the length L in the X-axis direction of the conductive patch 42 may be half an emission wavelength caused by the differential signal. The two feed lines may be connected to the lower surface of the patch 42 at the first feed point P1 and the second feed point P2. The first feed point P1 and the second feed point P2 may be separated in the X-axis direction, and the positions of the first feed point P1 and the second feed point P2 on the lower surface of the conductive patch 42 may be determined by impedance matching. According to some example embodiments, the first feed point P1 and the second feed point P2 may be placed close to a first center line LY that is parallel to the X-axis and crosses the center of the conductive patch 42.

An electric field having opposite phases may be formed at both ends around an axis to be fed in the electric field distribution of the antenna module including the conductive patch 42. Therefore, when applying two input signals having opposite phases on the axis to be fed, that is, a differential signal, higher power may be transmitted without decrease in performance of the antenna module. For example, as shown in FIG. 3, when a signal having a relatively high potential is applied to the first feed point P1 and a signal having a relatively low potential is applied to the second feed point P2 due to the differential signal, an electric field having opposite phases may be formed at both ends on the basis of an axis that crosses the first feed point P1 and the second feed point P2, that is, an axis parallel to the X-axis. Therefore, the antenna gain may be maintained compared to a single feed structure, and meanwhile, the EIRP may be doubled.

Figure 4:
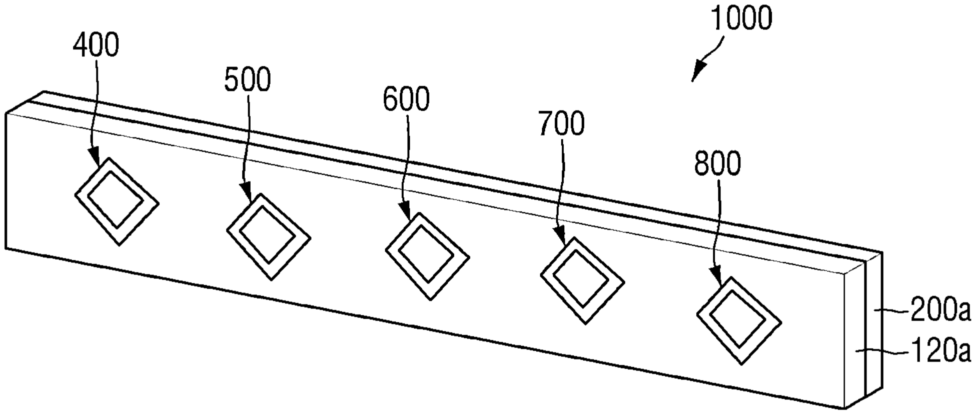
FIG. 4 is a diagram which schematically shows the antenna array according to some example embodiments.
Figure 5:
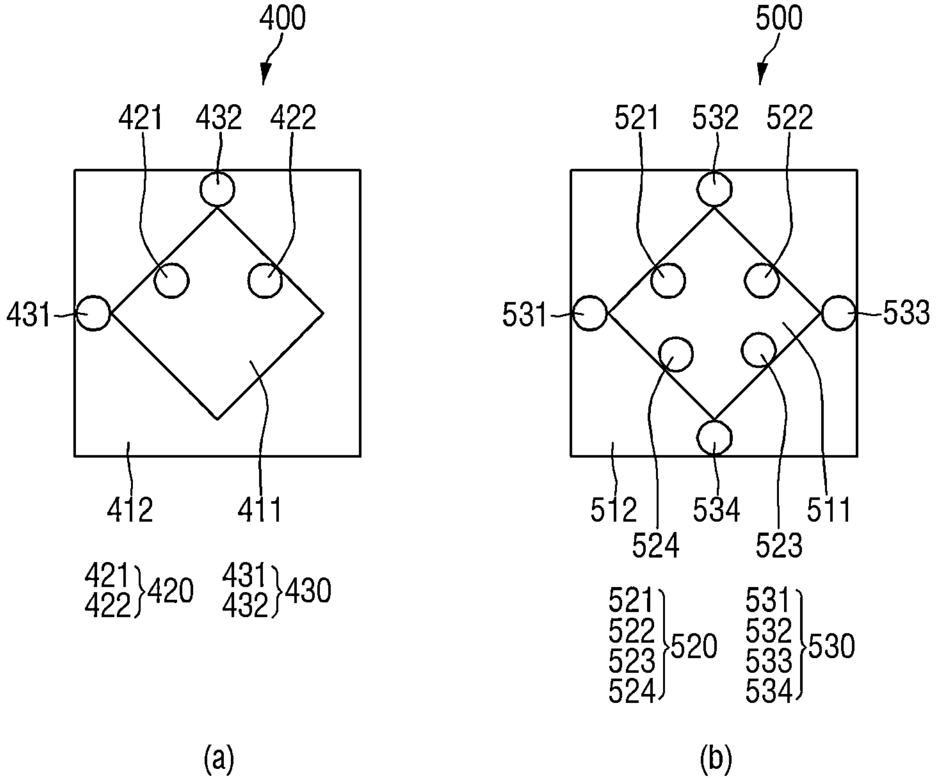
FIG. 5 is a diagram illustrating an antenna module according to some example embodiments.
Figure 6:
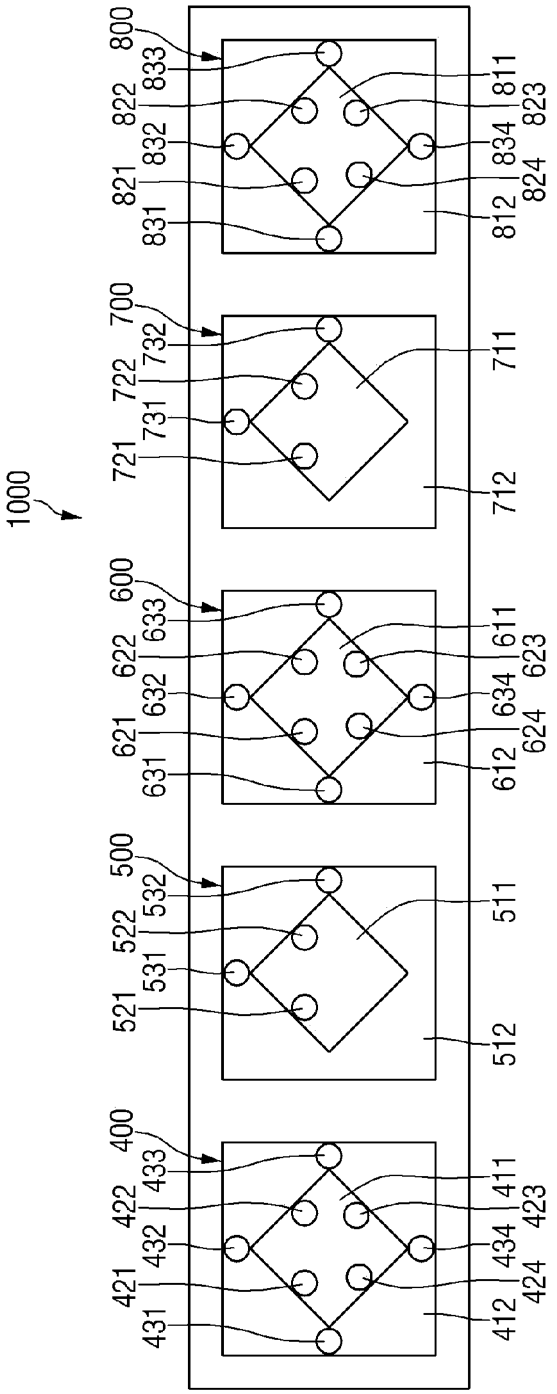
FIGS. 6 and 7 are diagrams illustrating an antenna array according to some example embodiments.
Figure 7:
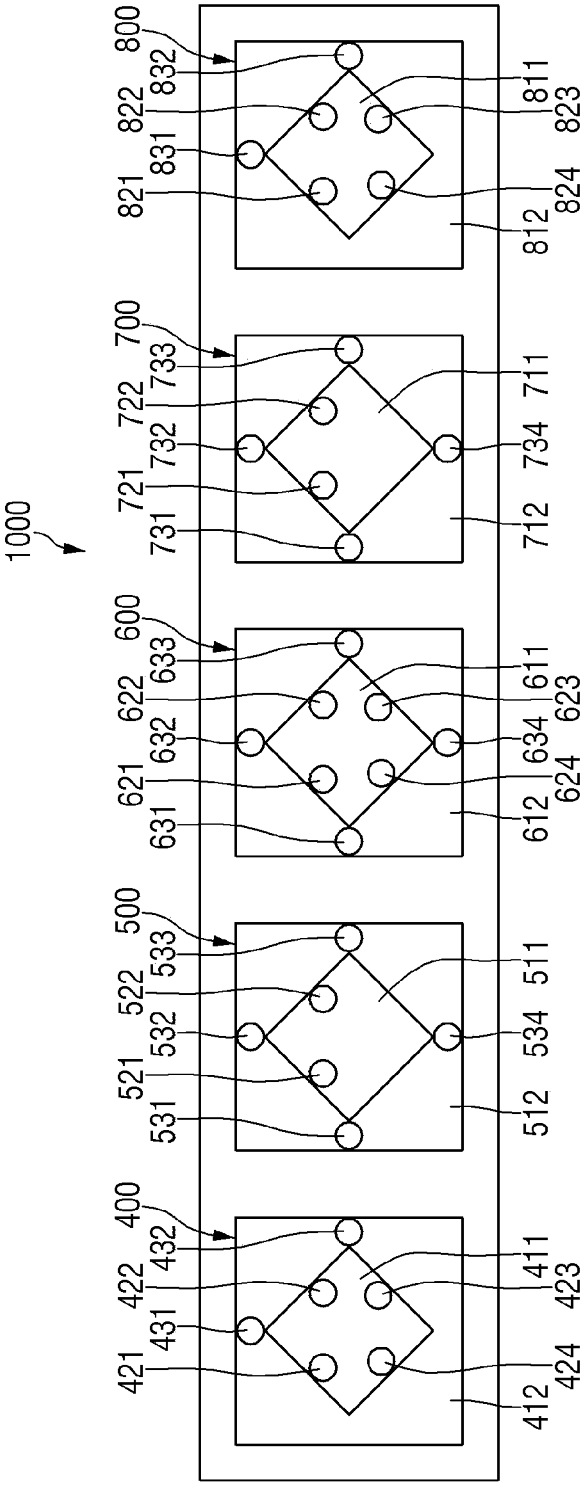
Figure 8:
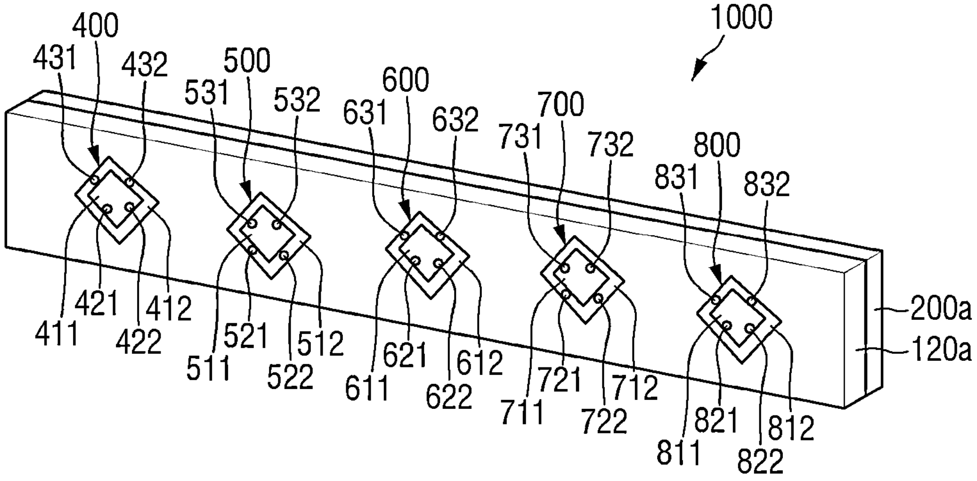
FIG. 8 is a diagram which schematically shows the antenna array according to some example embodiments.
Figure 9A:
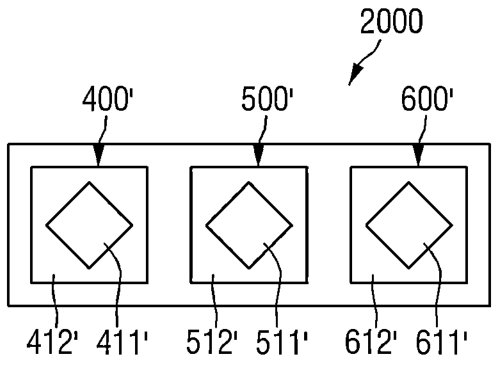
FIGS. 9(*a*), 9(*b*) and 9(*c*) are diagrams illustrating an antenna module according to some example embodiments.
Figure 9B:
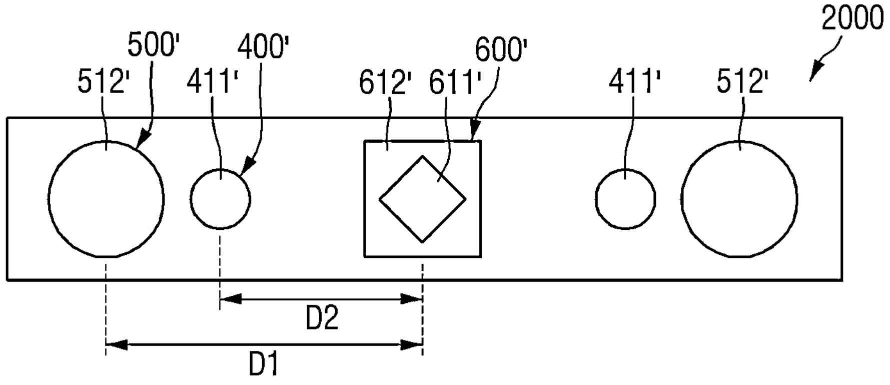
Figure 9C:
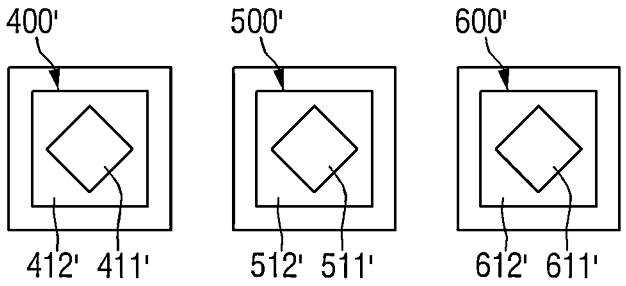

FIG. 4 is a diagram which schematically shows the antenna array according to some example embodiments. FIG. 5 is a diagram for explaining the antenna module according to some example embodiments. FIGS. 6 and 7 are diagrams for explaining an antenna array according to some example embodiments. FIG. 8 is a diagram which schematically shows the antenna array according to some example embodiments. FIGS. 9(*a*) to 9(*c*) are diagrams for explaining an antenna module according to some example embodiments. For convenience of explanation, repeated contents or substantially the same contents in each example embodiment may be simply described or omitted.

Referring to FIG. 4, an RF system 20*a* (e.g., an electronic device) includes a first RFIC chip 200*a*, a first antenna module 400, a second antenna module 500, a third antenna module 600, a fourth antenna module 700 and a fifth antenna module 800. Each of the antenna modules 400, 500, 600, 700, and 800 described below may mean an antenna element including a conductive patch, respectively. Further, a first antenna array 1000 in which each antenna element is placed may mean an antenna module connected to the first RFIC chip 200*a*.

Referring to FIGS. 4 and 5(*a*), the first antenna module 400 may include a plurality of feed points 420 and 430 electrically connected to the first RFIC chip 200*a* through a first feed line.

The first antenna module 400 may include a first conductive patch 411 that transmits and/or receives a signal of a first frequency band, and a second conductive patch 412 that transmits and/or receives a signal of a second frequency band lower than the first frequency band.

In some example embodiments, the first conductive patches 411, 511, 611, 711, and 811 are placed on an upper side of the substrate 120*a*, and the second conductive patches 412, 512, 612, 712, and 812 may be placed inside the substrate 120*a*. That is, the first conductive patches 411, 511, 611, 711, and 811 may be placed on the second conductive patches 412, 512, 612, 712, and 812. However, inventive concepts of the present disclosure are not limited thereto.

In some example embodiments, shapes of the first and second conductive patches 411, 412, 511, 512, 611, 612, 711, 712, 811 and 812 of the first to fifth antenna modules 400, 500, 600, 700, and 800 may be various shapes, such as a rhombus, a quadrangle or a circle. However, inventive concepts of the present disclosure are not limited thereto.

The first RFIC chip 200*a* may provide signals to the feed points 420 and 430 of the first antenna module 400 through a first feed line configured to provide at least one differential signal.

The first antenna module 400 is connected to each of the feed points 420 and 430 in the first conductive patch 411 and the second conductive patch 412, and may receive the differential signal from the first RFIC chip 200*a*.

Specifically, referring to FIG. 5(*a*), the first antenna module 400 may be connected to the feed points 421 and 422 of the first conductive patch 411 to receive the differential signal from the first RFIC chip 200*a*. Further, the first antenna module 400 may be connected to the feed points 431 and 432 of the second conductive patch 412 to receive the differential signal from the first RFIC chip 200*a*.

The first antenna module 400 may operate as a dual polarization antenna in the first frequency band through the feed points 421 and 422. Further, the first antenna module 400 may operate as a dual polarization antenna in the second frequency band through the feed points 431 and 432.

Referring to FIGS. 4 and 5(*b*), the second antenna module 500 is placed apart from the first antenna module 400, and includes a plurality of feed points 520 and 530 electrically connected to the first RFIC chip 200*a* through the second feed line.

The second antenna module 500 may include a first conductive patch 511 that transmits and/or receives a signal of the first frequency band, and a second conductive patch 512 that transmits and/or receives a signal of the second frequency band lower than the first frequency band.

The first RFIC chip 200*a* may provide signals to the feed points 520 and 530 of the second antenna module 500 through a second feed line configured to provide at least one differential signal.

The second antenna module 500 may be connected to each of the feed points 520 and 530 in the first conductive patch 511 and the second conductive patch 512 to receive the differential signal from the first RFIC chip 200*a*.

Specifically, referring to FIG. 5(*b*), the second antenna module 500 may be connected to the feed points 521, 522, 523, and 524 of the first conductive patch 511 to receive the differential signal from the first RFIC chip 200*a*. A pair of feed points 521 and 523 may be placed at positions symmetrical with each other in the first conductive patch 511, and a pair of feed points 522 and 524 may be placed at positions symmetrical with each other in the first conductive patch 511.

Further, the second antenna module 500 may be connected to the feed points 531, 532, 533, and 534 of the second conductive patch 512 to receive the differential signal from the first RFIC chip 200*a*. A pair of feed points 531 and 533 may be placed at positions symmetrical with each other on the basis of the center of the second conductive patch 512, and a pair of feed points 532 and 534 may be placed at positions symmetrical with each other on the basis of the center of the second conductive patch 512.

The second antenna module 500 may operate as a dual polarization antenna in the first frequency band through the feed points 521, 522, 523, and 524. The second antenna module 500 may operate as a dual polarization antenna in the second frequency band through the feed points 531, 532, 533, and 534.

Referring to FIGS. 4 to 7, the first to fifth antenna modules 400, 500, 600, 700, and 800 may form the first antenna array 1000.

Although not specifically shown, the first antenna array 1000 may further include a passive element in addition to the first to fifth antenna modules 400, 500, 600, 700, and 800.

In some example embodiments, the antenna modules 400 and 500 of FIGS. 5(*a*) and 5(*b*) described above may be applied to at least one of the antenna modules included in the first antenna array 1000. However, example embodiments are not limited thereto, and as in the second and fourth antenna modules 500 and 700 of FIG. 7, which will be described later, the antenna modules included in the first antenna array 1000 may be different from the antenna modules 400 and 500 of FIGS. 5(*a*) and 5(*b*).

Referring to FIG. 6, the first antenna module 400 of FIG. 5(*a*) described above may have the same or substantially the same structure and shape as those of the second antenna module 500 of FIG. 6. Further, the second antenna module 500 of FIG. 5(*b*) may have the same or substantially the same structure and shape as those of the first antenna module 400 of FIG. 6.

Referring to FIG. 6, the third antenna module 600 is placed apart from the first and second antenna modules 400 and 500, and may include a plurality of feed points 621, 622, 623, 624, 631, 632, 633, and 634 electrically connected to the first RFIC chip 200*a* through a third feed line.

The third antenna module 600 may include a first conductive patch 611 that transmits and/or receives a signal of the first frequency band, and a second conductive patch 612 that transmits and/or receives a signal of the second frequency band lower than the first frequency band.

The first RFIC chip 200*a* may provide the signal to the feed points 621, 622, 623, 624, 631, 632, 633, and 634 of the third antenna module 600 through a third feed line configured to provide at least one differential signal.

The third antenna module 600 may be connected to each of the feed points 621, 622, 623, 624, 631, 632, 633, and 634 in the first conductive patch 611 and the second conductive patch 612 to receive the differential signal from the first RFIC chip 200*a*.

Specifically, the third antenna module 600 may be connected to the feed points 621, 622, 623, and 624 of the first conductive patch 611 to receive the differential signal from the first RFIC chip 200*a*. The pair of feed points 621 and 623 may be placed at positions symmetrical with each other on the basis of the center of the first conductive patch 611, and the pair of feed points 622 and 624 may be placed at positions symmetrical with each other on the basis of the center of the first conductive patch 611.

Further, the third antenna module 600 may be connected to the feed points 631, 632, 633, and 634 of the second conductive patch 612 to receive the differential signal from the first RFIC chip 200*a*. The pair of feed points 631 and 633 may be placed at positions symmetrical with each other on the basis of the center of the second conductive patch 612, and the pair of feed points 632 and 634 may be placed at positions symmetrical with each other on the basis of the center of the second conductive patch 612.

The third antenna module 600 may operate as a dual polarization antenna in the first frequency band through the feed points 621, 622, 623, and 624. The third antenna module 600 may operate as a dual polarization antenna in the second frequency band through the feed points 631, 632, 633, and 634.

The fourth antenna module 700 is placed apart from the third antenna module 600, and may include a plurality of feed points 721, 722, 731, and 732 electrically connected to the first RFIC chip 200*a* through a fourth feed line.

The fourth antenna module 700 may include a first conductive patch 711 that transmits and/or receives a signal of the first frequency band, and a second conductive patch 712 that transmits and/or receives a signal of the second frequency band lower than the first frequency band.

The first RFIC chip 200*a* may provide signals to the feed points 721, 722, 731, and 732 of the fourth antenna module 700 through the fourth feed line configured to provide at least one differential signal.

The fourth antenna module 700 may be connected to each of the feed points 721, 722, 731, and 732 in the first conductive patch 711 and the second conductive patch 712 to receive the differential signal from the first RFIC chip 200*a*.

Specifically, the fourth antenna module 700 may be connected to the feed points 721 and 722 of the first conductive patch 711 to receive the differential signal from the first RFIC chip 200*a*. Further, the fourth antenna module 700 may be connected to the feed points 731 and 732 of the second conductive patch 712 to receive the differential signal from the first RFIC chip 200*a*.

The fourth antenna module 700 may operate as a dual polarization antenna in the first frequency band through the feed points 721 and 722. Further, the fourth antenna module 700 may operate as a dual polarization antenna in the second frequency band through the feed points 731 and 732.

The fifth antenna module 800 is placed apart from the fourth antenna module 700, and may include a plurality of feed points 821, 822, 823, 824, 831, 832, 833 and 834 electrically connected to the first RFIC chip 200*a* through a fifth feed line.

The fifth antenna module 800 may include a first conductive patch 811 that transmits and/or receives the signal of the first frequency band, and a second conductive patch 812 that transmits and/or receives a second frequency band lower than the first frequency band.

The first RFIC chip 200*a* may provide the signal to the feed points 821, 822, 823, 824, 831, 832, 833, and 834 of the fifth antenna module 800 through a fifth feed line configured to provide at least one differential signal.

The fifth antenna module 800 may be connected to each of the feed points 821, 822, 823, 824, 831, 832, 833, and 834 in the first conductive patch 811 and the second conductive patch 812 to receive the differential signal from the RFIC chip 200*a*.

Specifically, the fifth antenna module 800 may be connected to the feed points 821, 822, 823, and 824 of the first conductive patch 811 to receive the differential signal from the first RFIC chip 200*a*. The pair of feed points 821 and 823 may be placed at positions symmetrical with each other on the basis of the center of the first conductive patch 811, and the pair of feed points 822 and 824 may be placed at positions symmetrical with each other on the basis of the center of the first conductive patch 811.

Further, the fifth antenna module 800 may be connected to the feed points 831, 832, 833, and 834 of the second conductive patch 812 to receive the differential signal from the first RFIC chip 200*a*. The pair of feed points 831 and 833 may be placed at positions symmetrical with each other on the basis of the center of the second conductive patch 812, and the pair of feed points 832 and 834 may be placed at positions symmetrical with each other on the basis of the center of the second conductive patch 812.

The fifth antenna module 800 may operate as a dual polarization antenna in the first frequency band through the feed points 821, 822, 823, and 824. The fifth antenna module 800 may operate as a dual polarization antenna in the second frequency band through the feed points 831, 832, 833, and 834.

Referring to FIG. 7, the antenna module included in the first antenna array 1000 may be different from the antenna modules 400 and 500 of FIGS. 5(*a*) and 5(*b*). Specifically, the number of feed points of each of the first and fifth antenna modules 400 and 800 may be different from the number of feed points of the first antenna module 400 of FIG. 5(*a*).

The first antenna module 400 may include a plurality of feed points electrically connected to the first RFIC chip 200*a* through the first feed line.

The first antenna module 400 may include a first conductive patch 411 that transmits and/or receives the signal of the first frequency band, and a second conductive patch 412 that transmits and/or receives the signal of the second frequency band lower than the first frequency band.

The first RFIC chip 200*a* may provide the signal to the feed points 421, 422, 423, 424, 431, and 432 of the first antenna module 400 through the first feed line configured to provide at least one differential signal.

The first antenna module 400 may be connected to each of the feed points 421, 422, 423, 424, 431, and 432 in the first conductive patch 411 and the second conductive patch 412 to receive the differential signal from the first RFIC chip 200*a*.

Specifically, the first antenna module 400 may be connected to the feed points 421, 422, 423, and 424 of the first conductive patch 411 to receive the differential signal from the first RFIC chip 200*a*.

The pair of feed points 421 and 423 may be placed at positions symmetrical with each other on the basis of the center of the first conductive patch 411, and the pair of feed points 422 and 424 may be placed at positions symmetrical with each other on the basis of the center of the first conductive patch 411.

Further, the first antenna module 400 may be connected to the feed points 431 and 432 of the second conductive patch 412 to receive the differential signal from the first RFIC chip 200*a*.

The first antenna module 400 may operate as a dual polarization antenna in the first frequency band through the feed points 421, 422, 423, and 424. The first antenna module 400 may operate as a dual polarization antenna in the second frequency band through the feed points 431 and 432.

The second antenna module 500 may include a plurality of feed points 521, 522, 531, 532, 533, and 534 electrically connected to the first RFIC chip 200*a* through a second feed line.

The second antenna module 500 may include a first conductive patch 511 that transmits and/or receives the signal of the first frequency band, and a second conductive patches 512 that transmits and/or receives the signal of the second frequency band lower than the first frequency band.

The first RFIC chip 200*a* may provide the signal to the feed points 521, 522, 531, 532, 533, and 534 of the second antenna module 500 through a first feed line configured to provide at least one differential signal.

The second antenna module 500 may be connected to each of the feed points 521, 522, 531, 532, 533, and 534 in the first conductive patch 511 and the second conductive patch 512 to receive the differential signal from the first RFIC chip 200*a*.

Specifically, the second antenna module 500 may be connected to the feed points 521 and 522 of the first conductive patch 511 to receive the differential signal from the first RFIC chip 200*a*.

Further, the second antenna module 500 may be connected to the feed points 531, 532, 533, and 534 of the second conductive patch 512 to receive the differential signal from the first RFIC chip 200*a*.

The pair of feed points 531 and 533 may be placed at positions symmetrical with each other on the basis of the center of the second conductive patch 512, and the pair of feed points 532 and 534 may be placed at positions symmetrical with each other on the basis of the center of the second conductive patch 512.

The second antenna module 500 may operate as a dual polarization antenna in the first frequency band through the feed points 521 and 522. The second antenna module 500 may operate as a dual polarization antenna in the second frequency band through the feed points 531, 532, 533, and 534.

The description of the third antenna module 600 of FIG. 6 may be equally applied to the third antenna module 600 of FIG. 7.

The fourth antenna module 700 may include a plurality of feed points 721, 722, 731, 732, 733, and 734 electrically connected to the first RFIC chip 200*a* through the fourth feed line.

The fourth antenna module 700 may include a first conductive patch 711 that transmits and/or receives the signal of the first frequency band, and a second conductive patch 712 that transmits and/or receives the signal of the second frequency band lower than the first frequency band.

The first RFIC chip 200*a* may provide the signal to the feed points 721, 722, 731, 732, 733, and 734 of the fourth antenna module 700 through a first feed line configured to provide at least one differential signal.

The fourth antenna module 700 may be connected to each of the feed points 721, 722, 731, 732, 733, and 734 in the first conductive patch 711 and the second conductive patch 712 to receive the differential signal from the first RFIC chip 200*a*.

Specifically, the fourth antenna module 700 may be connected to the feed points 721 and 722 of the first conductive patch 711 to receive the differential signal from the first RFIC chip 200*a*.

Further, the fourth antenna module 700 may be connected to the feed points 731, 732, 733, and 734 of the second conductive patch 712 to receive the differential signal from the first RFIC chip 200*a*.

The pair of feed points 731 and 733 may be placed at positions symmetrical with each other on the basis of the center of the second conductive patch 711, and the pair of feed points 732 and 734 may be placed at positions symmetrical with each other on the basis of the center of the second conductive patch 812.

The fourth antenna module 700 may operate as a dual polarization antenna in the first frequency band through the feed points 721 and 722. The fourth antenna module 700 may operate as a dual polarization antenna in the second frequency band through the feed points 731, 732, 733, and 734.

The fifth antenna module 800 may include a plurality of feed points 821, 822, 823, 824, 831, and 832 electrically connected to the first RFIC chip 200*a* through the fifth feed line.

The fifth antenna module 800 may include a first conductive patch 811 that transmits and/or receives the signal of the first frequency band, and a second conductive patch 812 that transmits and/or receives the signal of the second frequency band lower than the first frequency band.

The first RFIC chip 200*a* may provide the signal to the feed points 821, 822, 823, 824, 831, and 832 of the fifth antenna module 800 through the fifth feed line configured to provide at least one differential signal.

The fifth antenna module 800 may be connected to each of the feed points 821, 822, 823, 824, 831 and 832 in the first conductive patch 811 and the second conductive patch 812 to receive a differential signal from the first RFIC chip 200*a*.

Specifically, the fifth antenna module 800 may be connected to the feed points 821, 822, 823, and 824 of the first conductive patch 811 to receive the differential signal from the first RFIC chip 200*a*. The pair of feed points 821 and 823 may be placed at positions symmetrical with each other in the first conductive patch 811, and the pair of feed points 822 and 824 may be placed at positions symmetrical with each other in the first conductive patch 811.

Further, the fifth antenna module 800 may be connected to the feed points 831 and 832 of the second conductive patch 812 to receive the differential signal from the first RFIC chip 200*a*.

The fifth antenna module 800 may operate as a dual polarization antenna in the first frequency band through the feed points 821, 822, 823, and 824. The fifth antenna module 800 may operate as a dual polarization antenna in the second frequency band through the feed points 831 and 832.

In the case of FIG. 6 described above, each of the first, third and fifth antenna modules 400, 600 and 800 may include additional feed points 423, 424, 433, 434, 623, 624, 633, 634, 823, 824, 833, and 834 as compared to the antenna module 400 of FIG. 5(*a*).

Further, in the case of FIG. 7, the first and fifth antenna modules 400 and 800 may include additional feed points 423, 424, 823, and 824 as compared to the antenna module 400 of FIG. 5(*a*). Also, in the case of FIG. 7, the second and fourth antenna modules 500 and 700 may include additional feed points 533, 534, 733, and 734 as compared to the antenna module 400 of FIG. 5(*a*).

According to some example embodiments, even if the number of pins (e.g., RF balls) of the first RFIC chip 200*a* is not twenty (for example, thirty-two or more or less), five antenna modules 400, 500, 600, 700, and 800 using the dual frequency band and the differential feeding method may be used and connected to the first RFIC chip 200*a*.

In some example embodiments, the number and positions of the feed points of the five antenna modules 400, 500, 600, 700, and 800 may be variously formed depending on the desired effect. In other words, the number of feed points of each antenna module may be set differently to achieve the desired high output characteristics for each frequency or polarization.

That is, the number and positions of the feed points of each of the antenna modules 400, 500, 600, 700, and 800 may be placed in a configuration different from that of FIGS. 6 and 7. In some example embodiments, features in each example embodiment may be appropriately combined within the scope of the inventive concepts.

For example, more feed points may be placed in the conductive patch of the low frequency band, more feed points may be placed in the conductive patch of the high frequency band, etc.

Further, as shown in FIGS. 6 and 7, the first and second antenna modules 400 and 500 and the fourth and fifth antenna modules 700 and 800 may be placed symmetrically with each other on the basis of the third antenna module 600. For example, the first and second antenna modules 400 and 500 may be symmetrical with the fourth and fifth antenna modules 700 and 800 with respect to an axis of the third antenna module 600 (such as a vertical center axis of the third antenna module 600). In some example embodiments, in the electronic device using the first antenna array 1000, the power may be applied symmetrically on the basis of the third antenna module 600.

Further, the first antenna array 1000 may form a flat plate-shaped patch antenna and also a linear antenna such as a dipole antenna, as a radiating element. In some example embodiments, the features in each example embodiment may be appropriately combined within the scope of the inventive concepts.

That is, when using an electronic device using the first antenna array 1000 including the first to fifth antenna modules 400, 500, 600, 700, and 800 according to some example embodiments, an output can be achieved more efficiently within a limited space.

FIG. 8 is a diagram which schematically shows the antenna array according to some example embodiments. FIGS. 9(*a*) to 9(*c*) are diagrams for explaining an antenna module according to some example embodiments. For convenience of explanation, repeated contents or substantially the same contents of the contents described in FIGS. 4 to 7 may be simplified or omitted.

Referring to FIG. 8, the first to fifth antenna modules 400, 500, 600, 700, and 800 may form the first antenna array 1000.

The first to fifth antenna modules 400, 500, 600, 700, and 800 may include a plurality of feed points electrically connected to the first RFIC chip 200*a* through the first to fifth feed lines.

Each of antenna modules 400, 500, 600, 700, 800, 400', 500', and 600' described below may mean an antenna element including a conductive patch, respectively. Further, the first antenna array 1000 in which each antenna element is placed may mean an antenna module connected to the first RFIC chip 200*a*. Further, the second antenna array 2000 in which each antenna element is placed may mean an antenna array that is not connected to the first RFIC chip 200*a*.

The first to fifth antenna modules 400, 500, 600, 700, and 800 may include first conductive patches 411, 511, 611, 711, and 811 that transmit and/or receive the signal of the first frequency band, and second conductive patches 412, 512, 612, 712, and 812 that transmit and/or receive the signal of the second frequency band lower than the first frequency band.

The first RFIC chip 200*a* may provide the signal to the feed points of the first to fifth antenna modules 400, 500, 600, 700, and 800 through the first to fifth feed lines configured to provide at least one differential signal.

The first antenna module 400 may be connected to each of the feed points 420 and 430 in the first conductive patch 411 and the second conductive patch 412 to receive the differential signal from the first RFIC chip 200*a*.

Specifically, the first antenna module 400 may be connected to the feed points 421 and 422 of the first conductive patch 411 to receive the differential signal from the first RFIC chip 200*a*. Further, the first antenna module 400 may be connected to the feed points 431 and 432 of the second conductive patch 412 to receive the differential signal from the first RFIC chip 200*a*.

The first antenna module 400 may operate as a dual polarization antenna in the first frequency band through the feed points 421 and 422. Further, the first antenna module 400 may operate as a dual polarization antenna in the second frequency band through the feed points 431 and 432.

The second antenna module 500 may be connected to each of the feed points 521, 522, 532, and 532 in the first conductive patch 511 and the second conductive patch 512 to receive the differential signal from the first RFIC chip 200*a*.

Specifically, the second antenna module 500 may be connected to the feed points 521 and 522 of the first conductive patch 511 to receive the differential signal from the first RFIC chip 200*a*. Further, the second antenna module 500 may be connected to the feed points 531 and 532 of the second conductive patch 512 to receive the differential signal from the first RFIC chip 200*a*.

The second antenna module 500 may operate as a dual polarization antenna in the first frequency band through the feed points 521 and 522. Further, the second antenna module 500 may operate as a dual polarization antenna in the second frequency band through the feed points 531 and 532.

The third antenna module 600 may be connected to each of the feed points 621, 622, 631 and 632 in the first conductive patch 611 and the second conductive patch 612 to receive the differential signal from the first RFIC chip 200*a*.

Specifically, the third antenna module 600 may be connected to the feed points 621 and 622 of the first conductive patch 611 to receive the differential signal from the first RFIC chip 200*a*. Further, the third antenna module 600 may be connected to the feed points 631 and 632 of the second conductive patch 612 to receive the differential signal from the first RFIC chip 200*a*.

The third antenna module 600 may operate as a dual polarization antenna in the first frequency band through the feed points 621 and 622. Further, the third antenna module 600 may operate as a dual polarization antenna in the second frequency band through the feed points 631 and 632.

The fourth antenna module 700 may be connected to each of the feed points 721, 722, 731, and 732 in the first conductive patch 711 and the second conductive patch 712 to receive the differential signal from the first RFIC chip 200*a*.

Specifically, the fourth antenna module 700 may be connected to the feed points 721 and 722 of the first conductive patch 711 to receive the differential signal from the first RFIC chip 200*a*. Further, the fourth antenna module 700 may be connected to the feed points 731 and 732 of the second conductive patch 712 to receive the differential signal from the first RFIC chip 200*a*.

The fourth antenna module 700 may operate as a dual polarization antenna in the first frequency band through the feed points 721 and 722. Further, the fourth antenna module 700 may operate as a dual polarization antenna in the second frequency band through the feed points 731 and 732.

The fifth antenna module 800 may be connected to each of the feed points 821, 822, 831, and 832 in the first conductive patch 811 and the second conductive patch 812 to receive the differential signal from the first RFIC chip 200*a*.

Specifically, the fifth antenna module 800 may be connected to the feed points 821 and 822 of the first conductive patch 811 to receive the differential signal from the first RFIC chip 200*a*. Further, the fifth antenna module 800 may be connected to the feed points 831 and 832 of the second conductive patch 812 to receive the differential signal from the first RFIC chip 200*a*.

The fifth antenna module 800 may operate as a dual polarization antenna in the first frequency band through the feed points 821 and 822. Further, the fifth antenna module 800 may operate as a dual polarization antenna in the second frequency band through the feed points 831 and 832.

Referring to FIG. 9(*a*), a second antenna array 2000 including sixth to eighth antenna modules 400', 500', and 600', which may be electrically connected to the first RFIC chip 200*a* and spaced apart from each other, may be further included. The second antenna array 2000 may be placed apart from the first antenna array 1000.

Each of the sixth to eighth antenna modules 400', 500', and 600' may include first conductive patches 411', 511', and 611' that transmit and/or receive signal of the first frequency band, and second conductive patches 412', 512', and 612' that transmit and/or receive the signal of the second frequency band lower than the first frequency band.

The number of antenna modules 400, 500, 600, 700, and 800 of the first antenna array 1000 may be larger than the number of antenna modules 400', 500', and 600' of the second antenna array 2000. Further, for example, the number of feed points of the first to eighth antenna modules 400, 500, 600, 700, 800, 400', 500', and 600' may be equal to each other. Therefore, the total number of feed points of each of the antenna modules 400, 500, 600, 700, and 800 included in the first antenna array 1000 may be greater than the total number of feed points of each of the antenna modules 400', 500', and 600' included in the second antenna array 2000. However, inventive concepts of the present disclosure are not limited thereto.

According to some example embodiments, an occurrence of communication shading region may be supplemented, by placing the second antenna array 2000 including the additional antenna modules having different numbers of feed points to be spaced apart from the first antenna array 1000. As a result, the communication radius of the antenna may be further expanded within the limited space.

Referring to FIG. 9(*b*), a sixth antenna module 400' of the second antenna array 2000 may be formed by a first conductive patch 411' that transmits and/or receives of the signal of the first frequency band. A seventh antenna module 500' is placed apart from the sixth antenna module 400', and may be formed by a second conductive patch 512' that transmits and/or receives signal of the second frequency band lower than the first frequency band. An eighth antenna module 600' is placed apart from the sixth and seventh antenna modules 400' and 500', and may include both first and second conductive patches 611' and 612' that transmit and/or receive the signals of the first and second frequency bands.

A first distance D1 between the seventh and eighth antenna modules 500' and 600' may be greater than a second distance D2 between the sixth and eighth antenna modules 400' and 600'. In some example embodiments, each of the first and second distances D1 and D2 may be more than half the emission wavelength due to the differential signal. However, inventive concepts of the present disclosure are not limited thereto.

The sixth and seventh antenna modules 400' and 500' nay be placed symmetrically each other on the basis of the eighth antenna module 600'. For example, the sixth and seventh antenna modules 400' and 500' may be symmetrical with respect to an axis of the eighth antenna module 600' (such as a vertical center axis of the eighth antenna module 600'). Further, the sixth and seventh antenna modules 400' and 500' may be circular. Further, the size of the first conductive patch 411' of the sixth antenna module 400' may be smaller than the size of the second conductive patch 512' of the seventh antenna module 500'. However, inventive concepts of the present disclosure are not limited thereto.

According to some example embodiments, the antenna gain is increased, and improved EIRP characteristics can be achieved. Further, in a terminal or the like including the antenna module according to some example embodiments, a high degree of freedom can be achieved in the arrangement of the antenna module inside the terminal.

Referring to FIG. 9(*c*), the sixth to eighth antenna modules 400', 500', and 600' may not be formed by a single antenna array, and may be placed apart from the first antenna array 1000. Each of the sixth to eight antenna modules 400', 500', and 600' may include first conductive patches 411', 511', and 611' that transmit and/or receive signal of the first frequency band, and second conductive patches 412', 512', and 612' that transmit and/or receive the signal of the second frequency band lower than the first frequency band.

According to some example embodiments, the antenna gain may be increased and improved EIRP characteristics may be achieved. In addition, the mounting space inside the terminal may be used more efficiently, by placing such an antenna module to cover various directions, while having an appropriate level of RF loss.

Figure 10A:
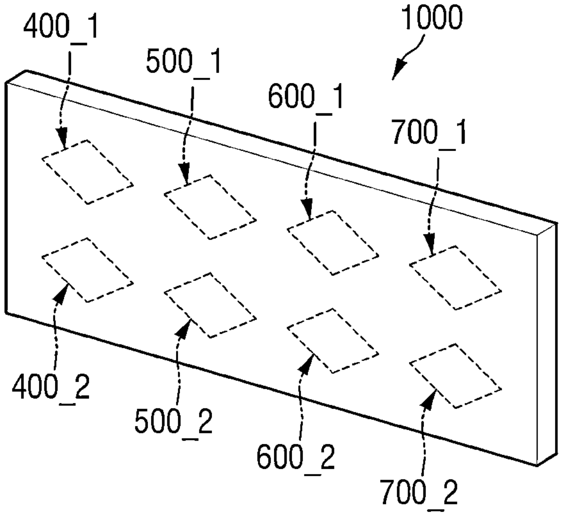
FIGS. 10(*a*) and 10(*b*) are diagrams schematically showing an antenna module according to some example embodiments.
Figure 10B:
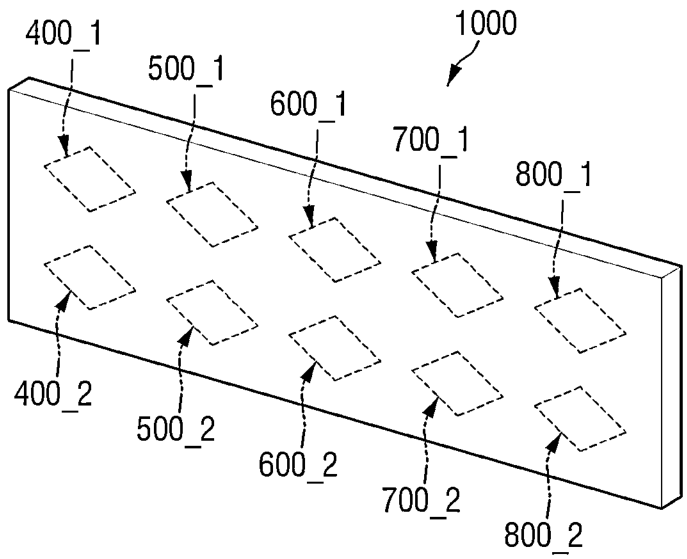
Figure 11:
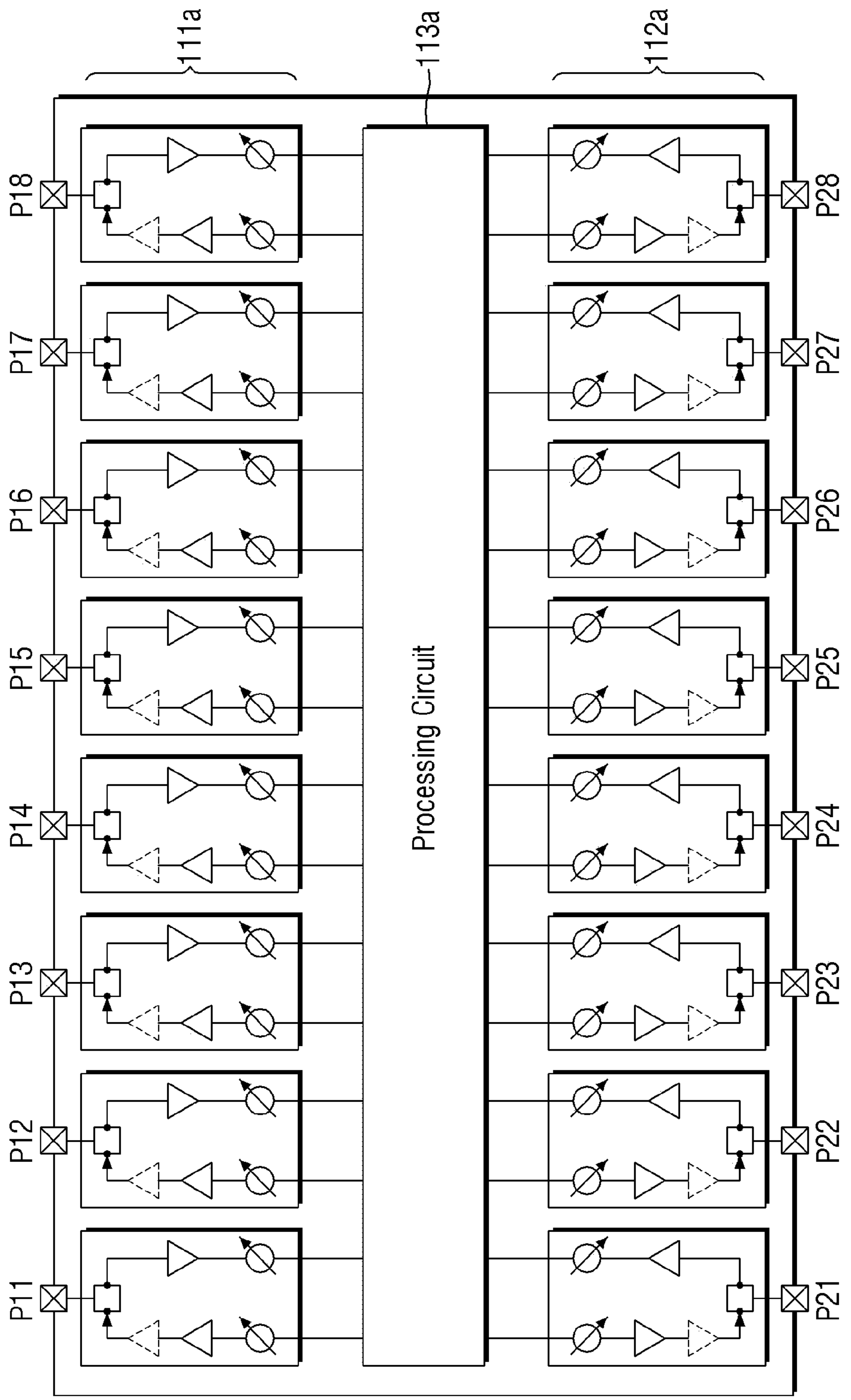
FIGS. 11 and 12 are diagrams illustrating an RFIC chip according to some example embodiments.
Figure 12:
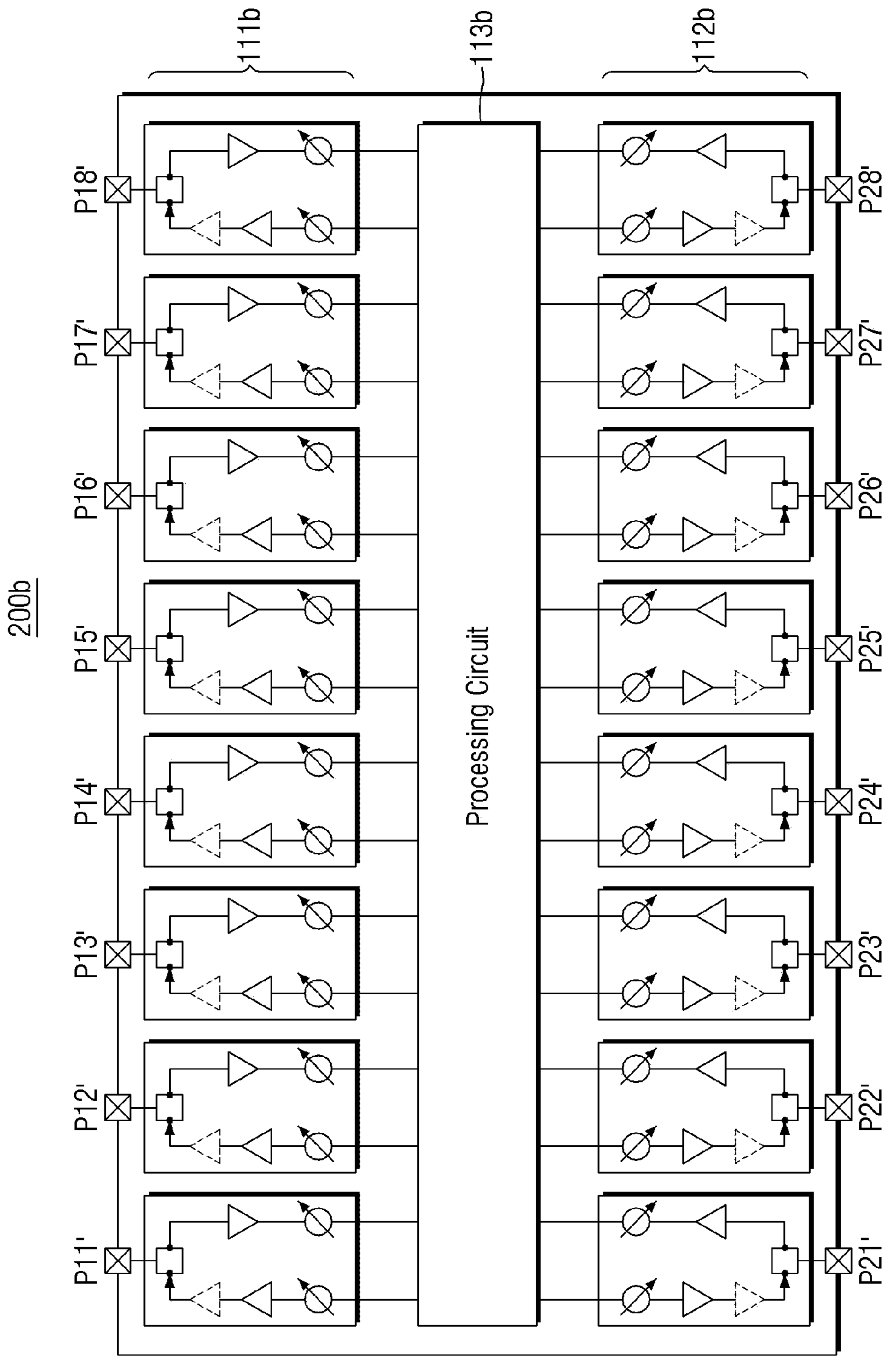

FIGS. 10(*a*) and 10(*b*) are diagrams schematically showing an antenna module according to some example embodiments. FIGS. 11 and 12 are diagrams for explaining the RFIC chip according to some example embodiments.

Referring to FIGS. 10 to 12, the RF system 20*a* may include an antenna module 1000, a first RFIC chip 200*a*, and a second RFIC chip 200*b*.

The antenna module 1000 may include a first plurality of feed points and a second plurality of feed points. The first RFIC chip 200*a* may be electrically connected to the first plurality of feed points of the antenna module 1000 through the first feed line. The second RFIC chip 200*b* may be electrically connected to the second plurality of feed points of the antenna module 1000 through the second feed line.

Referring to FIG. 10(*a*), the antenna module 1000 may include a first plurality of antenna patches 400_1, 500_1, 600_1, and 700_1, and a second plurality of antenna patches 400_2, 500_2, 600_2, and 700_2, each of which may be formed by four antenna patches. On the other hand, inventive concepts of the present disclosure are not limited thereto. For example, and as shown in FIG. 10(*b*), the antenna module 1000 may include a first plurality of antenna patches 400_1, 500_1 and 600_1, 700_1, and 800_1 and a second plurality of antenna patches 400_2, 500_2, 600_2, 700_2, and 800_2, each of which may be formed by five antenna patches. Although not specifically shown, in some example embodiments, the first RFIC chip connected to the first plurality of antenna patches 400_1, 500_1, 600_1, 700_1, and 800_1 may include ten first transmission/reception circuits, ten second transmission/reception circuits, and a processing circuit. Further, in some example embodiments, the electronic device may further include a second RFIC chip that is not electrically connected to the first RFIC chip. The second RFIC chip may include ten first transmission/reception circuits, ten second transmission/reception circuits, and a processing circuit.

Referring to FIGS. 10(*a*) and 11, the first RFIC chip 200*a* connected to the first plurality of antenna patches 400_1, 500_1, 600_1, and 700_1 may include eight first transmission/reception circuits 111a, eight second transmission/reception circuits 112*a*, and a processing circuit 113*a*. The first transmission/reception circuits 111a may be connected to the antenna patches 400_1, 500_1, 600_1, and 700_1 through the eight pins P11, P12, P13, P14, P15, P16, P17 and P18, and the second transmission/reception circuit 112*a* may be connected to the antenna patches 400_1, 500_1, 600_1, and 700_1 through the eight pins P21, P22, P23, P24, P25, P26, P27 and P28. The processing circuit 113*a* may be connected to the first transmission/reception circuits 111a and the second transmission/reception circuits 112*a*, and may include switches, a coupler/distributor, a mixer, an LO generator, and the like. As shown by a broken line in FIG. 11, some active elements included in the transmission circuit may be omitted in the first RFIC chip 200*a*, and the first RFIC chip 200*a* may be connected to an active element array including the omitted active elements. However, the technical idea of the present disclosure is not limited thereto.

Referring to FIGS. 10(*a*) and 12, the RF system 20*a* may further include a second RFIC chip 200*b* that is not electrically connected to the first RFIC chip 200*a*. The second RFIC chip 200*b* may include eight first transmission/reception circuits 111*b*, eight second transmission/reception circuits 112*b*, and a processing circuit 113*b*. The first transmission/reception circuits 111*b* may be connected to eight pins P11', P12', P13', P14', P15', P16', P17' and P18' for being connected to the antenna patches 400_2, 500_2, 600_2, and 700_2, and the second transmission/reception circuits 112*b* may also be connected to eight pins P21', P22', P23', P24', P25', P26', P27' and P28' for being connected to the antenna patches 400_2, 500_2, 600_2, and 700_2. The processing circuit 113*b* may be connected to the first transmission/reception circuits 111*b* and the second transmission/reception circuits 112*b*, and may include switches, a coupler/distributor, a mixer, an LO generator, and the like. As shown by the broken line in FIG. 12, some active elements included in the transmission circuit may be omitted in the second RFIC chip 200*b*, and the second RFIC chip 200*b* may be connected to the active element array including the omitted active elements. However, inventive concepts of the present disclosure are not limited thereto.

According to some example embodiments, by connecting a plurality of RFIC chips to one antenna module, an electronic device having a wider beam coverage may be achieved. As a result, a wider communication radius may be secured.

Figure 13:
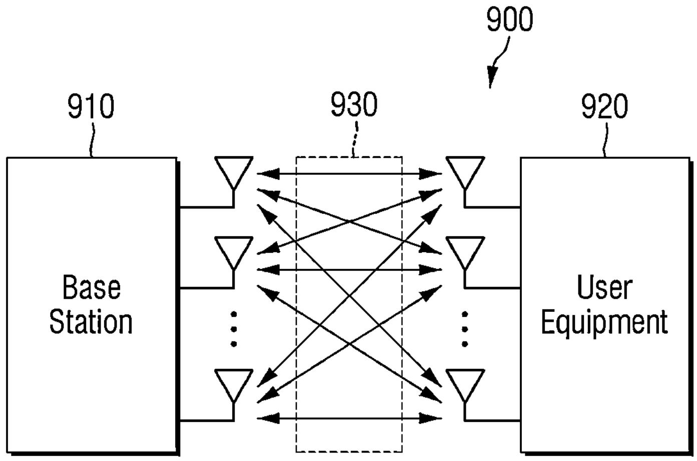
FIG. 13 is a diagram which schematically shows the communication equipment including the antenna module according to some example embodiments.

FIG. 13 is a diagram which schematically shows the communication equipment including the antenna module according to some example embodiments.

Specifically, FIG. 13 shows an example in which a base station 910 and a user equipment 920 perform wireless communication in a wireless communication system 900 using a cellular network. The base station 910 and the user equipment 920 may include an antenna of a multiple feeding structure, and may include an RFIC that provides a differential signal.

The base station 910 may be a fixed station that communicates with the user equipment and/or other base stations. For example, the base station 910 may include a Node B, eNB (evolved-Node B), a sector, a site, a BTS (Base Transceiver System), an AP (Access Pint), a relay node, a RRH (Remote Radio Head), a RU (Radio Unit), a small cell, and the like. The user equipment 920 may be fixed or have mobility, and may communicate with the base station to transmit and receive data and/or control information. For example, the user equipment 920 may include terminal equipment, a MS (Mobile Station), a MT (Mobile Terminal), a UT (User Terminal), a SS (Subscribe Station), a wireless device, a handheld device, and the like.

As shown in FIG. 13, the base station 910 and the user equipment 920 may each include a plurality of antennas, and may perform the wireless communication through a MIMO (Multiple Input Multiple Output) channel 930. Each of the plurality of antennas may have multiple feeding structures, and may have a dual polarization structure according to some example embodiments. The differential signal may be provided to the antenna by the RFIC, and the design features of the base station 910 or the user equipment 920 in which the antenna is installed may be satisfied. For example, the EIRP may be increased by doubling the RF path, and thus, the antenna area (or form factor) may decrease in half. In addition, the improved EIRP may allow a wider beam, may reduce the DC power loss in half, and may reduce complexity in phase resolution. In addition, since more RF paths in the RFIC may be utilized, the implementation of millimeter wave (mmWave) antenna module may be facilitated, using more relaxed transmission power. Further, according to some example embodiments, a dual polarization patch antenna may be easily implemented by applying two pairs of differential feeding structures to one patch antenna.

Figure 14:
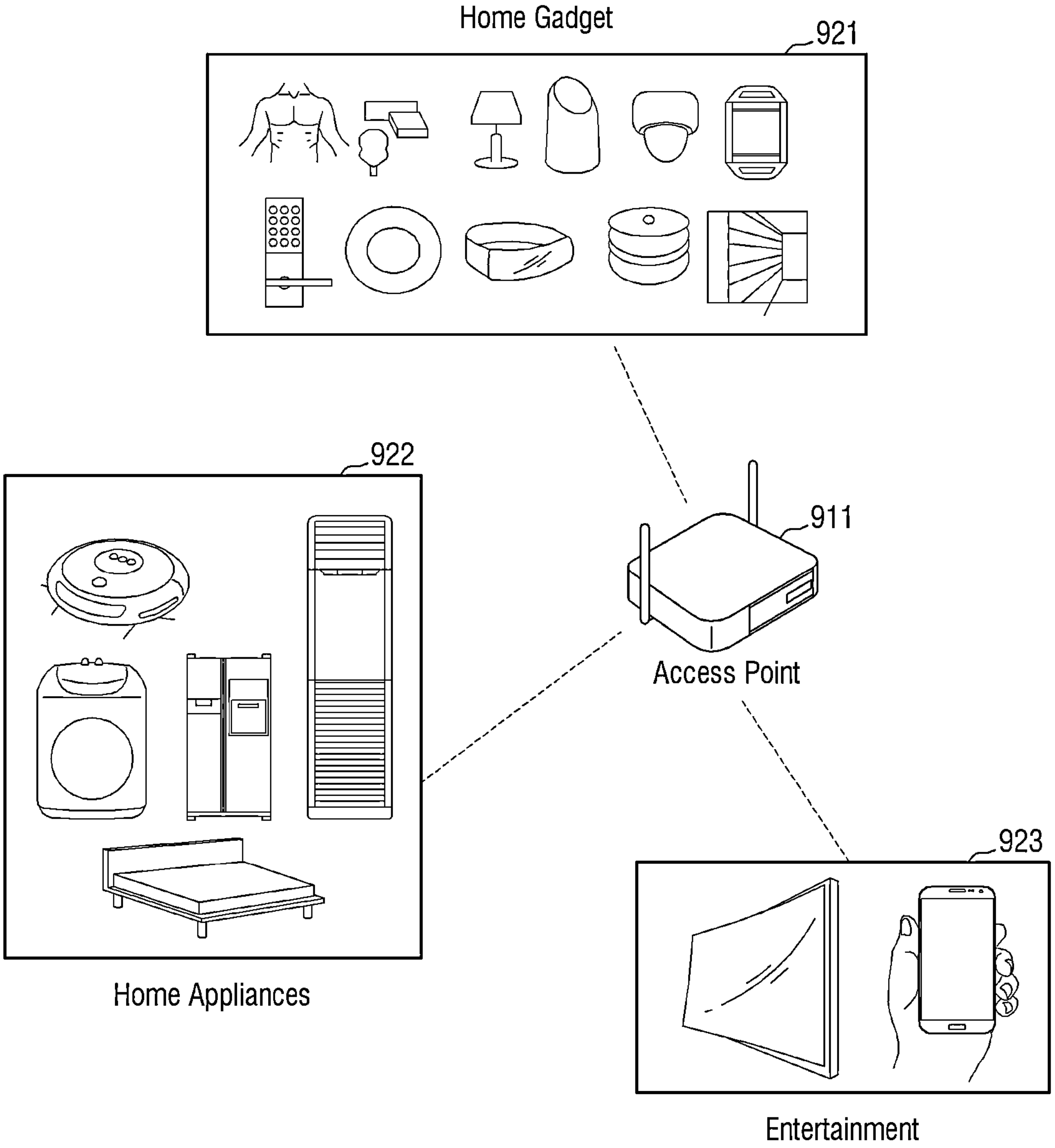
FIG. 14 is a diagram which schematically shows the communication equipment including the antenna module according to some example embodiments.

FIG. 14 is a diagram which schematically shows the communication equipment including the antenna module according to some example embodiments.

Specifically, FIG. 14 shows an example in which various types of wireless communication equipment communicate with each other in a wireless communication system using the WLAN. Each of various types of wireless communication equipment shown in FIG. 14 may include a multiple feed antenna, and may include an RFIC that provides the differential signal to the multiple feed antenna.

Home gadgets 921, home appliances 922, entertainment devices 923, and an AP 911 may configure an IoT (Internet of Things) network system. Each of the home gadgets 921, the home appliances 922, the entertainment devices 923, and the access point (AP) 911 may include transceivers according to some example embodiments as components. The home gadgets 921, the home appliances 922 and the entertainment devices 923 may wirelessly communicate with the AP 911, and the home gadgets 921, the home appliances 922 and the entertainment devices 923 may wirelessly communicate with each other.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

One or more of the elements disclosed above may include or be implemented in one or more processing circuitries such as hardware including logic circuits; a hardware/software combination such a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

In concluding the detailed description, it may be appreciated that many variations and modifications may be made to the example embodiments without departing from inventive concepts of the present disclosure. Therefore, the disclosed example embodiments are not for purposes of limitation.

What is claimed is:

1. An electronic device comprising:

a Radio Frequency Integrated Circuit (RFIC) chip;

a first antenna module including a plurality of feed points electrically connected to the RFIC chip through a first feed line; and a second antenna module apart from the first antenna module, the second antenna module including a plurality of feed points electrically connected to the RFIC chip through a second feed line, wherein, a number of the plurality of feed points of the first antenna module is different from a number of the plurality of feed points of the second antenna module, the plurality of feed points of the first antenna module include a first pair of feed points in a first conductive patch of the first antenna module, a second pair of feed points in the first conductive patch of the first antenna module, a third pair of feed points in a second conductive patch of the first antenna module, and a fourth pair of feed points in the second conductive patch of the first antenna module, the first conductive patch being on the second conductive patch, and the first conductive patch and the second conductive patch each having a rectangular shape, the first pair of feed points are symmetrical with each other on a basis of a center of the first conductive patch of the first antenna module, and the second pair of feed points are symmetrical with each other on the basis of the center of the first conductive patch, the first conductive patch includes a first corner and a second corner opposite the first corner in a first diagonal direction, and the feed points included in the third pair of feed points are respectively at the first corner and the second corner, and the first conductive patch further includes a third corner and a fourth corner opposite the third corner in a second diagonal direction, and the feed points included in the fourth pair of feed points are respectively at the third corner and the fourth corner.

2. The electronic device of claim 1, wherein the first conductive patch is configured to transmit and/or receive a signal of a first frequency band;

the second conductive patch is configured to transmit and/or receive a signal of a second frequency band lower than the first frequency band;

the second antenna module includes a third conductive patch configured to transmit and/or receive the signal of the first frequency band; and the second antenna module further includes a fourth conductive patch configured to transmit and/or receive the signal of the second frequency band lower than the first frequency band.

3. The electronic device of claim 1, wherein the RFIC chip is configured to provide at least one differential signal to the plurality of feed points of the first antenna module through the first feed line, and the RFIC chip is configured to provide at least one differential signal to the plurality of feed points of the second antenna module through the second feed line.

4. The electronic device of claim 1, wherein the second antenna module further includes an additional feed point configured to receive a signal from the RFIC chip through the second feed line.

5. The electronic device of claim 1, further comprising:

a third antenna module apart from the first antenna module and the second antenna module, the third antenna module including a plurality of feed points electrically connected to the RFIC chip through a third feed line;

a fourth antenna module apart from the third antenna module, the fourth antenna module including a plurality of feed points electrically connected to the RFIC chip through a fourth feed line; and a fifth antenna module apart from the fourth antenna module, the fifth antenna module including a plurality of feed points electrically connected to the RFIC chip through a fifth feed line.

6. The electronic device of claim 5, wherein the first antenna module and the second antenna module are symmetrical with the fourth antenna module and the fifth antenna module, with respect to an axis of the third antenna module.

7. The electronic device of claim 1, further comprising:

a first antenna array including the first antenna module and the second antenna module; and a third antenna module, a fourth antenna module and a fifth antenna module each spaced apart from the first antenna array and electrically connected to the RFIC chip.

8. The electronic device of claim 7, wherein the third antenna module, the fourth antenna module, and the fifth antenna module define a second antenna array, and each of the third antenna module, the fourth antenna module, and the fifth antenna module includes:

a third conductive patch configured to transmit and/or receive a signal of a first frequency band, and a fourth conductive patch configured to transmit and/or receive a signal of a second frequency band lower than the first frequency band.

9. The electronic device of claim 7, wherein the third antenna module, the fourth antenna module, and the fifth antenna module define a second antenna array, the third antenna module includes a third conductive patch configured to transmit and/or receive a signal of a first frequency band, the fourth antenna module is apart from the third antenna module, and includes a fourth conductive patch configured to transmit and/or receive a signal of a second frequency band lower than the first frequency band, and the fifth antenna module is apart from the second antenna module and the fourth antenna module, and includes fifth and sixth conductive patches.

10. The electronic device of claim 9, wherein a first distance between the fourth antenna module and the fifth antenna module is greater than a second distance between the third antenna module and the fifth antenna module.

11. The electronic device of claim 9, wherein the third antenna module and the fourth antenna module are symmetrical with each other, with respect to an axis of the fifth antenna module.

12. The electronic device of claim 9, wherein the third antenna module is between the fourth antenna module and the fifth antenna module.

13. The electronic device of claim 1, wherein the first antenna module and the second antenna module each include at least six feed points.

14. The electronic device of claim 1, wherein the third pair of feed points are symmetrical with each other on the basis of a center of the second conductive patch, and the fourth pair of feed points are symmetrical with each other on the basis of the center of the second conductive patch.

15. An electronic device comprising:

a Radio Frequency Integrated Circuit (RFIC) chip; and a first antenna array including a first antenna module, a second antenna module, a third antenna module, a fourth antenna module and a fifth antenna module each including a plurality of feed points electrically connected to the RFIC chip through a corresponding one of a first feed line, a second feed line, a third feed line, a fourth feed line and a fifth feed line each configured to provide at least one differential signal, wherein, each of the first antenna module, the second antenna module, the third antenna module, the fourth antenna module and the fifth antenna module includes a first conductive patch and a second conductive patch, the first conductive patch being on the second conductive patch, the first conductive patch having a rectangular shape and configured to transmit and/or receive a signal of a first frequency band, and the second conductive patch having a rectangular shape and configured to transmit and/or receive a signal of a second frequency band lower than the first frequency band, a number of the plurality of feed points of the first antenna module is different from a number of the plurality of feed points of the second antenna module, the plurality of feed points of the first antenna module include a first pair of feed points in the first conductive patch of the first antenna module, a second pair of feed points in the first conductive patch of the first antenna module, a third pair of feed points in the second conductive patch of the first antenna module, and a fourth pair of feed points in the second conductive patch of the first antenna module, the first pair of feed points are symmetrical with each other on a basis of a center of the first conductive patch, and the second pair of feed points are symmetrical with each other on the basis of the center of the first conductive patch, the first conductive patch includes a first corner and a second corner opposite the first corner in a first diagonal direction, and the feed points included in the third pair of feed points are respectively at the first corner and the second corner, and the first conductive patch further includes a third corner and a fourth corner opposite the third corner in a second diagonal direction, and the feed points included in the fourth pair of feed points are respectively at the third corner and the fourth corner.

16. The electronic device of claim 15, wherein the second antenna module further includes additional feed points configured to receive the at least one differential signal provided from the RFIC chip through the second feed line.

17. The electronic device of claim 15, wherein the first antenna module and the second antenna module are symmetrical with the fourth antenna module and the fifth antenna module, with respect to an axis of the third antenna module.

18. The electronic device of claim 15, further comprising:

a second antenna array spaced apart from the first antenna array, the second antenna array including a sixth antenna module, a seventh antenna module, and an eighth antenna module each electrically connected to the RFIC chip.

19. The electronic device of claim 18, wherein:

the sixth antenna module includes a third conductive patch;

the seventh antenna module is apart from the sixth antenna module, and the seventh antenna module includes a fourth conductive patch; and the eighth antenna module is apart from the seventh antenna module, and the eighth antenna module includes a fifth conductive patch and a sixth conductive patch.

* * * * *